US010976475B1

(12) United States Patent
Shibai et al.

(10) Patent No.: US 10,976,475 B1
(45) Date of Patent: Apr. 13, 2021

(54) ANTIFOULING FILM

(71) Applicant: SHARP KABUSHIKI KAISHA, Sakai (JP)

(72) Inventors: Yasuhiro Shibai, Sakai (JP); Ken Atsumo, Sakai (JP); Kenichiro Nakamatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 303 days.

(21) Appl. No.: 16/326,630

(22) PCT Filed: Jun. 28, 2017

(86) PCT No.: PCT/JP2017/023736
§ 371 (c)(1),
(2) Date: Feb. 19, 2019

(87) PCT Pub. No.: WO2018/037711
PCT Pub. Date: Mar. 1, 2018

(30) Foreign Application Priority Data

Aug. 25, 2016 (JP) .............................. JP2016-164640

(51) Int. Cl.
*G02B 1/18* (2015.01)
*B32B 3/30* (2006.01)
(Continued)

(52) U.S. Cl.
CPC .................. *G02B 1/18* (2015.01); *B32B 3/30* (2013.01); *B32B 27/18* (2013.01); *B32B 27/308* (2013.01);
(Continued)

(58) Field of Classification Search
CPC .. G02B 1/18; G02B 1/118; B32B 3/30; B32B 27/18; B32B 27/308; B32B 2307/746
See application file for complete search history.

(56) References Cited

U.S. PATENT DOCUMENTS

2009/0246494 A1   10/2009   Matsumoto
2011/0128629 A1*   6/2011   Takahashi ................ G02B 1/18
                                                                          359/601
(Continued)

FOREIGN PATENT DOCUMENTS

CN        103765249 A     4/2014
JP        2005-097371 A   4/2005
(Continued)

*Primary Examiner* — Nancy R Johnson
(74) *Attorney, Agent, or Firm* — ScienBiziP, P.C.

(57) ABSTRACT

The antifouling film includes a substrate, and a polymer layer disposed on a surface of the substrate and including on a surface thereof an uneven structure provided with multiple projections at a pitch not longer than a wavelength of visible light. The polymer layer is a cured product of a polymerizable composition, the polymerizable composition containing, in terms of active constituents, 15 to 40 wt % of an urethane acrylate containing six or more functional groups, 35 to 60 wt % of a multifunctional acrylate containing four or more functional groups and 3 to 15 ethylene oxide groups for each functional group, 15 to 30 wt % of a monofunctional acrylate with no ethylene oxide group, 0.5 to 10 wt % of a fluorine release agent containing a perfluoropolyether group and having a fluorine atom concentration of 50 wt % or lower, and 0.5 to 5 wt % of a polymerization initiator.

8 Claims, 2 Drawing Sheets

(51) Int. Cl.
*B32B 27/30* (2006.01)
*G02B 1/118* (2015.01)
*B32B 27/18* (2006.01)

(52) U.S. Cl.
CPC ........ *G02B 1/118* (2013.01); *B32B 2307/746* (2013.01)

(56) References Cited

U.S. PATENT DOCUMENTS

| | | | |
|---|---|---|---|
| 2013/0004718 A1* | 1/2013 | Takihara | C08F 2/50 428/156 |
| 2014/0127463 A1* | 5/2014 | Otani | B32B 27/20 428/141 |
| 2018/0050513 A1* | 2/2018 | Mizuno | B32B 27/285 |

FOREIGN PATENT DOCUMENTS

| | | |
|---|---|---|
| JP | 2007-071917 A | 3/2007 |
| JP | 2012-052125 A | 3/2012 |
| WO | 2007/040159 A1 | 4/2007 |

\* cited by examiner (a)

(b)

(c)

(d)

ANTIFOULING FILM

TECHNICAL FIELD

The present invention relates to antifouling films. The present invention more specifically relates to an antifouling film including an uneven structure of nanometer scale.

BACKGROUND ART

Various optical films exhibiting antireflective performance have been studied (e.g., see Patent Literatures 1 to 3). In particular, optical films having an uneven structure of nanometer scale (nanostructure) are known for their excellent antireflective performance. This uneven structure has a continuously varying refractive index from the air layer to the substrate, thereby capable of reducing reflected light significantly.

CITATION LIST

Patent Literature

Patent Literature 1: JP 2012-52125 A
Patent Literature 2: WO 2007/040159
Patent Literature 3: JP 2005-97371 A

SUMMARY OF INVENTION

Technical Problem

Although such optical films exhibit excellent antireflective performance, the uneven structure on the surface may cause easy spread of dirt such as fingerprints (sebaceous dirt) sticking thereon and may further cause difficulty in wiping off such dirt present between projections. The sticking dirt tends to be noticed because of its reflectance significantly different from the reflectance of the optical film. Accordingly, a functional film (antifouling film) has been desired which has an uneven structure of nanometer scale on the surface and is excellent in dirt wiping performance (e.g., fingerprint wiping performance), i.e., excellent in antifouling performance.

The inventors studied on the above issues to find that conventional antifouling films lack the adhesiveness between the substrate of the antifouling film and a polymer layer forming the surface (uneven structure) of the antifouling film, as well as the antifouling performance. The studies revealed that conventional antifouling films also lack the rubbing resistance and the reliability. For example, rubbing the surface (surface of an uneven structure) of the polymer layer causes projections to adhere to each other to be never restored (projections are fallen and never rise again) or breakage of projections. Therefore, increased rubbing resistance has been desired. Additionally, under high temperature/high humidity environment, materials forming the polymer layer may bleed out to reduce optical properties. Thus, increased reliability has been also required.

As mentioned, there have been no measures to improve antifouling performance, adhesiveness, rubbing resistance, and reliability of conventional antifouling films. For example, Patent Literatures 1 to 3 lack disclosure relating to adhesiveness or reliability. Also, there is still room for improving the antifouling performance and the rubbing resistance.

The present invention is devised in view of the above state of the art, and aims to provide an antifouling film excellent in all of antifouling performance, adhesiveness, rubbing resistance, and reliability.

Solution to Problem

The inventors made various studies on antifouling films excellent in all of antifouling performance, adhesiveness, rubbing resistance, and reliability. They thereby found a certain scheme in which predetermined proportions of components improving the respective properties are contained in a polymerizable composition that constitutes a polymer layer of an antifouling film. The inventors thus found measures for the above issues to arrive at the present invention.

In other words, an aspect of the present invention may be an antifouling film including: a substrate, and a polymer layer disposed on a surface of the substrate and including on a surface thereof an uneven structure provided with multiple projections at a pitch not longer than a wavelength of visible light, the polymer layer being a cured product of a polymerizable composition, the polymerizable composition containing, in terms of active constituents, 15 to 40 wt % of an urethane acrylate containing six or more functional groups, 35 to 60 wt % of a multifunctional acrylate containing four or more functional groups and 3 to 15 ethylene oxide groups for each functional group, 15 to 30 wt % of a monofunctional acrylate with no ethylene oxide group, 0.5 to 10 wt % of a fluorine release agent containing a perfluoropolyether group and having a fluorine atom concentration of 50 wt % or lower, and 0.5 to 5 wt % of a polymerization initiator.

The polymer layer may include a surface having a coefficient of dynamic friction of 2.0 or lower.

The polymer layer may include a surface having a contact angle of water of 130° or greater and a contact angle of hexadecane of 30° or greater.

The monofunctional acrylate may include one or both of N-acryloyl morpholine and N,N-dimethyl acrylamide.

The polymer layer may have a thickness of 5.0 μm or more and 20.0 μm or less.

The multiple projections may have an average pitch of 100 nm or longer and 400 nm or shorter.

The multiple projections may have an average height of 50 nm or higher and 600 nm or lower.

The multiple projections may have an average aspect ratio of 0.8 or more and 1.5 or less.

Advantageous Effects of Invention

The present invention can provide an antifouling film excellent in all of antifouling performance, adhesiveness, rubbing resistance, and reliability.

DESCRIPTION OF EMBODIMENTS

Hereinafter, the present invention is described in more detail based on an embodiment with reference to the drawings. The embodiment, however, is not intended to limit the scope of the present invention. Each of the configurations of the embodiment may appropriately be combined or modified within the spirit of the present invention.

The expression "X to Y" herein means "X or more and Y or less".

Embodiment

Figure 1:
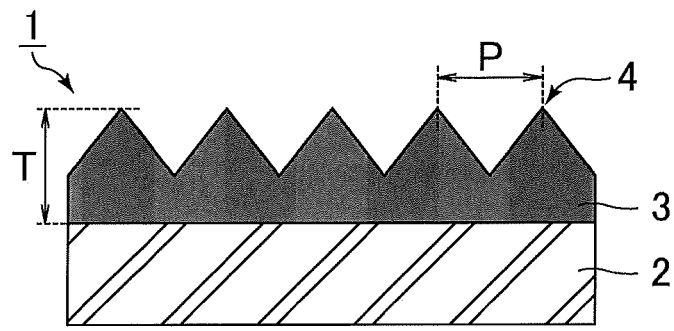
FIG. 1 is a schematic cross-sectional view of an antifouling film of an embodiment.
Figure 2:
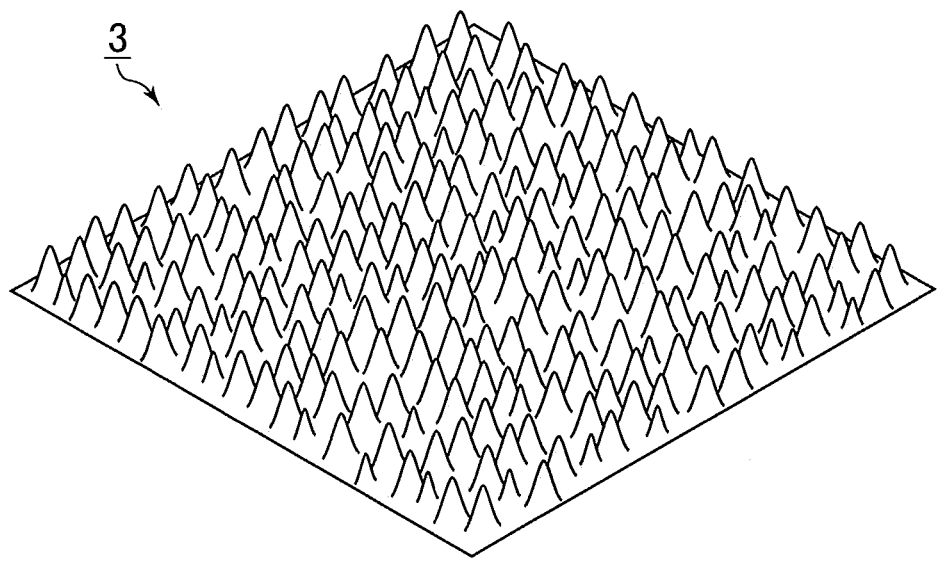
FIG. 2 is a schematic perspective view of the polymer layer in FIG. 1.

An antifouling film of an embodiment is described below with reference to FIG. 1 and FIG. 2. FIG. 1 is a schematic cross-sectional view of an antifouling film of the embodiment. FIG. 2 is a schematic perspective view of the polymer layer in FIG. 1.

An antifouling film 1 includes a substrate 2 and a polymer layer 3 disposed on a surface of the substrate 2.

The substrate 2 may be formed of, for example, a resin such as triacetyl cellulose (TAC), polyethylene terephthalate (PET), or methyl methacrylate (MMA). The substrate 2 may appropriately include an additive such as a plasticizer in addition to the above material. The substrate 2 may have undergone easy adhesion treatment on the surface (polymer layer 3 side surface). For example, a triacetyl cellulose film having undergone easy adhesion treatment may be used. The substrate 2 may have undergone saponification treatment on the surface (polymer layer 3 side surface). For example, a saponified triacetyl cellulose film may be used. When the antifouling film 1 is attached to a display device including a polarizer, such as a liquid crystal display device, the substrate 2 may constitute a part of the polarizer.

The thickness of the substrate 2 is preferably 50 μm or more and 100 μm or less in terms of assuring the transparency and the processability.

The polymer layer 3 includes on its surface an uneven structure, i.e., a moth-eye structure (structure like a moth's eye), provided with multiple projections (protrusions) 4 at a pitch P (distance between the apexes of adjacent projections 4) not longer than the wavelength of visible light (780 nm). The antifouling film 1 can thus exhibit excellent antireflective performance (low reflectivity) by the moth-eye structure.

The thickness T of the polymer layer 3 is preferably thin in terms of distributing fluorine atoms in the later described fluorine release agent on the surface (the surface opposite to the substrate 2) of the polymer layer 3 at a high concentration. Specifically, the thickness T of the polymer layer 3 is preferably 5.0 μm or more and 20.0 μm or less, more preferably 8.0 μm or more and 12.0 μm or less. As shown in FIG. 1, the thickness T of the polymer layer 3 indicates the distance from the surface on the substrate 2 side to the apex of a projection 4.

Examples of the shape of the projections 4 include those tapering toward the tip (tapered shapes) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 4 are inclined. The bases may be flat without inclination.

The multiple projections 4 have an average pitch of preferably 100 nm or longer and 400 nm or shorter, more preferably 100 nm or longer and 200 nm or shorter, in terms of sufficiently preventing occurrence of optical phenomena such as moiré and iridescence. The average pitch of the multiple projections 4 specifically means the average value of the pitches between all adjacent projections in a 1-μm square region of a plane photograph taken with a scanning electron microscope.

The multiple projections 4 have an average height of preferably 50 nm or higher and 600 nm or lower, more preferably 100 nm or higher and 300 nm or lower, in terms of satisfying the later described preferred average aspect ratio of the multiple projections 4. The average height of the multiple projections 4 specifically means the average height of sequential ten projections in a cross-sectional photograph taken with a scanning electron microscope. The ten projections are selected with damaged projections and deformed projections (e.g., projections deformed in preparation of a measurement sample) excluded.

The multiple projections 4 have an average aspect ratio of preferably 0.8 or more and 1.5 or less, more preferably 1.0 or more and 1.3 or less. Multiple projections 4 with an average aspect ratio of less than 0.8 may cause insufficient prevention of optical phenomena such as moiré and iridescence, possibly failing in achieving excellent antireflective performance. Multiple projections 4 with an average aspect ratio of more than 1.5 may deteriorate the processability of the uneven structure, possibly causing sticking or deteriorated transforming performance in formation of the uneven structure (e.g., clogging of the later described die 6, twining of the material). The average aspect ratio of the multiple projections 4 means a ratio of the average height of the multiple projections 4 to the average pitch thereof (height/pitch).

The projections 4 may be arranged randomly or regularly (periodically). The projections 4 may be arranged periodically, but are preferably arranged without periodicity (arranged randomly) as shown in FIG. 2, thereby preventing occurrence of unnecessary diffracted light derived from periodical projections.

The polymer layer 3 is a cured product of a polymerizable composition. Examples of the polymer layer 3 include a cured product of an active energy ray-curable polymerizable composition and a cured product of a heat curable polymerizable composition. Examples of active energy rays include ultraviolet rays, visible rays, infrared rays, and plasma. The polymer layer 3 is preferably a cured product of an active energy ray-curable polymerizable composition, more preferably a cured product of an ultraviolet ray-curable polymerizable composition.

The polymerizable composition contains, in terms of active constituents, 15 to 40 wt % of an urethane acrylate containing six or more functional groups (hereinafter, also referred to as component A), 35 to 60 wt % of a multifunctional acrylate containing four or more functional groups and 3 to 15 ethylene oxide groups for each functional group (hereinafter, also referred to as component B), 15 to 30 wt % of a monofunctional acrylate with no ethylene oxide group (hereinafter, also referred to as component C), 0.5 to 10 wt % of a fluorine release agent containing a perfluoropolyether group and having a fluorine atom concentration of 50 wt % or lower (hereinafter, also referred to as component D), and 0.5 to 5 wt % of a polymerization initiator (hereinafter, also referred to as component E).

Active constituents of the polymerizable composition (active constituents of components A to E) mean substances that work as constituents of the polymer layer 3 after curing and exclude components that do not contribute to curing reaction (polymerization reaction) (e.g. solvent). For example, an active constituent of the component D is a compound containing a fluorine atom in a molecule.

The polymerizable composition may contain additional component(s) as long as the composition contains the components A to E at the described proportions.

The components A to E are described below.

(Component A)

The component A, in which cohesion of urethane bonds increases the crosslinking density of the polymer layer 3 to give appropriate hardness (elasticity), improves the rubbing resistance. The cohesion of urethane bonds further improves the adhesiveness between the substrate 2 and the polymer layer 3 (hereinafter, also simply referred to as adhesiveness).

In the component A, the urethane acrylate contains six or more, preferably eight or more, more preferably ten or more functional groups. A urethane acrylate containing five or less functional groups fails in increasing the crosslinking density of the polymer layer 3 to cause too low a hardness, thereby deteriorating the rubbing resistance. A urethane acrylate containing too many functional groups excessively increases the viscosity of the urethane acrylate to reduce the compatibility with other components, thereby possibly deteriorating the rubbing resistance. In view of these points, the upper limit of the number of functional groups of the urethane acrylate is preferably 15. The number of functional groups of the urethane acrylate means the number of acryloyl groups for each molecule.

The proportion of the component A in the polymerizable composition is, in terms of active constituents, 15 to 40 wt %, preferably 20 to 35 wt %, more preferably 25 to 30 wt %. Less than 15 wt % of the proportion of the component A in terms of active constituents fails in increasing the crosslinking density of the polymer layer 3 to cause too low a hardness, thereby deteriorating the rubbing resistance. Such a proportion also causes too small an amount of urethane bonds, thereby reducing the adhesiveness. More than 40 wt % of the proportion of the component A in terms of active constituents excessively increases the crosslinking density of the polymer layer 3 to cause insufficient elasticity (reduced flexibility), thereby deteriorating the rubbing resistance. When the polymerizable composition contains multiple kinds of components A, the total proportion of the multiple kinds of components A may fall within the above range in terms of active constituents.

Known examples of the component A include an urethane acrylate component (number of functional groups: 6) in each of "UA-306H", "UA-306T", "UA-3061", and "UA-510H" available from Kyoeisha Chemical Co., Ltd.; "KUA-9N" (number of functional groups: 9), "KUA-10N" (number of functional groups: 10), and "KUA-15N" (number of functional groups: 15) available from KSM Co., Ltd.; "U-6LPA", "UA-1100H" (number of functional groups: 6), "UA-33H" (number of functional groups: 9), "U-10HA", "U-10PA" (number of functional groups: 10), and "UA-53H" (number of functional groups: 15) available from Shin-Nakamura Chemical Co., Ltd.; and "Ebecryl®1290", "Ebecryl 5129" (number of functional groups: 6), "KRM®8904" (number of functional groups: 9), and "KRM8452" (number of functional groups: 10) available from Daicel-Allnex Ltd.

(Component B)

The component B increases the crosslinking density of the polymer layer 3 to give appropriate hardness (elasticity), thereby improving the rubbing resistance. Furthermore, an ethylene oxide group having a high polarity improves the interaction with the substrate 2, thereby improving the adhesiveness. The rubbing resistance is considered to relate to the crosslinking density and the glass transition temperature of the polymer layer 3. That is, an increase in crosslinking density and a decrease in glass transition temperature can significantly improve the rubbing resistance. For example, in the case where the polymerizable composition contains a multifunctional acrylate with a propylene oxide group, the glass transition temperature increases compared with the case of containing a multifunctional acrylate with an ethylene oxide group. This is because a branched —CH₃ in the propylene oxide group inhibits the molecular motion. The propylene oxide group (the same shall apply to a hydrocarbon group), which has a polarity lower than an ethylene oxide group and thus lowers the interaction with the substrate 2, also deteriorates the adhesiveness. Accordingly, in the present embodiment, an ethylene oxide group is selected in terms of the rubbing resistance and the adhesiveness.

In the component B, the multifunctional acrylate contains four or more, preferably six or more, more preferably nine or more functional groups. A multifunctional acrylate containing three or less functional groups fails in increasing the crosslinking density of the polymer layer 3 to cause too low a hardness, thereby deteriorating the rubbing resistance. A multifunctional acrylate containing too many functional groups causes too high a crosslinking density of the polymer layer 3 to reduce the elasticity, thereby possibly deteriorating the rubbing resistance. In view of these points, the upper limit of the number of functional groups of the multifunctional acrylate is preferably 15. The number of functional groups of the multifunctional acrylate means the number of acryloyl groups for each molecule.

In the component B, the multifunctional acrylate contains 3 to 15 ethylene oxide groups for each functional group, preferably 4 to 12 ethylene oxide groups for each functional group, more preferably 6 to 9 ethylene oxide groups for each functional group. Less than three ethylene oxide groups for each functional group causes insufficient elasticity of the polymer layer 3 to deteriorate the rubbing resistance. More than 15 ethylene oxide groups for each functional group excessively reduce the crosslinking density of the polymer layer 3 to deteriorate the rubbing resistance. Here, the number of ethylene oxide groups for each functional group means (number of ethylene oxide groups for each molecule)/(number of acryloyl groups for each molecule).

The proportion of the component B in the polymerizable composition is, in terms of active constituents, 35 to 60 wt %, preferably 40 to 55 wt %, more preferably 45 to 50 wt %. Less than 35 wt % of the proportion of the component B in terms of active constituents causes insufficient elasticity of the polymer layer 3, thereby deteriorating the rubbing resistance. More than 60 wt % of the proportion of the component B in terms of active constituents causes too low a crosslinking density of the polymer layer 3, thereby deteriorating the rubbing resistance. When the polymerizable composition contains multiple kinds of components B, the total proportion of the multiple kinds of components B may fall within the above range in terms of active constituents.

Examples of the component B include ethoxylated pentaerythritol tetraacrylate and ethoxylated polyglycerol polyacrylate. Known examples of ethoxylated pentaerythritol tetraacrylate include "ATM-35E" (number of functional groups: 4, number of ethylene oxide groups: 8.75 for each functional group) available from Shin-Nakamura Chemical Co., Ltd. Known examples of ethoxylated polyglycerol polyacrylate include "NK Economer® A-PG5027E" (number of functional groups: 9, number of ethylene oxide groups: 3 for each functional group) and "NK Economer A-PG5054E" (number of functional groups: 9, number of ethylene oxide groups: 6 for each functional group) available from Shin-Nakamura Chemical Co., Ltd.

(Component C)

The component C improves the compatibility between the components A, B, and D, thereby improving the rubbing resistance. Furthermore, the component C, which suppresses cure shrinkage of the polymerizable composition and thus increases the cohesion with the substrate 2, improves the adhesiveness. The components A and B, both having a large molecular weight, have low compatibility between them. The components A and B, both having multifunctional groups, have low adhesiveness between them after cure shrinkage. The component D may have a long chain structure and thereby may have low compatibility with the components A and B. Thus, the component C not only increases the cohesion with the substrate 2 but also functions as a reactive diluent (compatibilizer) for the components A, B, and D.

The component C contains no ethylene oxide group. A monofunctional acrylate containing an ethylene oxide group, having a long chain structure, has a low glass transition temperature but exhibits low reactivity. Thus, a large amount of the monofunctional acrylate containing an ethylene oxide group tends to cause bleed out. The monofunctional acrylate containing an ethylene oxide group has low compatibility with the component D. Thus, a small amount of the monofunctional acrylate containing an ethylene oxide group fails in improving the compatibility while a large amount thereof tends to cause bleed out though improving the compatibility. Such inconvenience similarly occurs in the case of a monomer containing a propylene oxide group and a monomer containing a long chain hydrocarbon group, for example.

The proportion of the component C in the polymerizable composition is, in terms of active constituents, 15 to 30 wt %, preferably 18 to 28 wt %, more preferably 20 to 25 wt %. Less than 15 wt % of the proportion of the component C in terms of active constituents deteriorates the smoothness to cause poor rubbing resistance. Such a proportion fails in suppressing cure shrinkage of the polymerizable composition to reduce the adhesiveness. More than 30 wt % of the proportion of the component C in terms of active constituents excessively reduces the crosslinking density of the polymer layer 3 to deteriorate the rubbing resistance. When the polymerizable composition contains multiple kinds of components C, the total proportion of the multiple kinds of components C may fall within the above range in terms of active constituents.

Examples of the component C include monomers containing an amide group, such as N-acryloyl morpholine, N,N-dimethyl acrylamide, N,N-diethyl acrylamide, N-(2-hydroxy ethyl)acrylamide, diacetone acrylamide, and N-n-butoxy methyl acrylamide; monomers containing an ether group, such as tetrahydrofuran acrylate; and monomers containing a hydroxyl group, such as 4-hydroxy butyl acrylate. Known examples of N-acryloyl morpholine include "ACMO®" available from KJ Chemicals Corporation. Known examples of N,N-dimethyl acrylamide include "DMAA®" available from KJ Chemicals Corporation. Known examples of N,N-diethyl acrylamide include "DEAR®" available from KJ Chemicals Corporation. Known examples of N-(2-hydroxy ethyl)acrylamide include "HEAA®" available from KJ Chemicals Corporation. Known examples of diacetone acrylamide include "DAAM®" available from Nihon Kasei Co., Ltd. Known examples of N-n-butoxy methyl acrylamide include "NBMA" available from MCC Unitec Co., Ltd. Known examples of tetrahydrofuran acrylate include "Viscoat #150" available from Osaka Organic Chemical Industry Ltd. Known examples of 4-hydroxy butyl acrylate include "4HBA" available from Nihon Kasei Co., Ltd.

The component C preferably includes one or both of N-acryloyl morpholine and N,N-dimethyl acrylamide. Such a composition lowers the viscosity of the component C, thereby further improving the compatibility with the components A, B, and D. The adhesiveness is further improved when the substrate 2 is a triacetyl cellulose film.

(Component D)

The component D, which allows uniform distribution of fluorine atoms on the surface (surface opposite to the substrate 2) of the polymer layer 3 and reduces the surface free energy of the polymer layer 3, improves the antifouling performance. Furthermore, the smoothness is improved and thereby the rubbing resistance is improved.

The fluorine atom concentration in the component D is 50 wt % or lower. More than 50 wt % of the fluorine atom concentration excessively reduces the compatibility with the components A to C to prevent fluorine atoms from being uniformly distributed on the surface (surface opposite to the substrate 2) of the polymer layer 3, leading to deterioration in antifouling performance and rubbing resistance. Such a concentration also tends to cause bleed out under high temperature/high humidity environment to reduce the reliability. Too low a fluorine atom concentration excessively reduces the amount of fluorine atoms distributed on the surface (surface opposite to the substrate 2) of the polymer layer 3 to possibly cause deterioration in antifouling performance and rubbing resistance. In view of these points, the lower limit of the fluorine atom concentration is preferably 20 wt %.

The component D contains a perfluoropolyether group. A release agent without perfluoropolyether group (e.g. fluorine release agent containing a perfluoro alkyl group, silicon-based release agent) fails in sufficiently improving the antifouling performance and the rubbing resistance of the polymer layer 3.

The proportion of the component D in the polymerizable composition is, in terms of active constituents, 0.5 to 10 wt %, preferably 1 to 5 wt %, more preferably 1.5 to 3 wt %. Less than 0.5 wt % of the proportion of the component D in terms of active constituents excessively reduces the amount of fluorine atoms distributed on the surface (surface opposite to the substrate 2) of the polymer layer 3 to deteriorate the antifouling performance. Such a proportion also deteriorates the smoothness to cause poor rubbing resistance. More than 10 wt % of the proportion of the component D in terms of active constituents excessively reduces the compatibility with the components A to C to fail in uniformly distributing fluorine atoms on the surface (surface opposite to the substrate 2) of the polymer layer 3 to deteriorate the antifouling performance and rubbing resistance. Such a proportion also tends to cause bleed out under high temperature/high humidity environment to deteriorate the reliability. When the polymerizable composition contains multiple kinds of components D, the total proportion of the multiple kinds of components D may fall within the above range in terms of active constituents.

Known examples of the component D include "Fomblin® MT70" (fluorine atom concentration: 43 wt %) and "Fomblin AD1700" (fluorine atom concentration: 24 wt %) available from Solvay.

(Component E)

The component E improves the curability of the polymerizable composition.

The proportion of the component E in the polymerizable composition is, in terms of active constituents, 0.5 to 5 wt %, preferably 1 to 4 wt %, more preferably 1.5 to 3 wt %. Less than 0.5 wt % of the proportion of the component E in terms of active constituents causes insufficient curing of the polymerizable composition. More than 5 wt % of the proportion of the component E in terms of active constituents tends to cause bleed out under high temperature/high humidity environment to deteriorate the reliability. When the polymerizable composition contains multiple kinds of components E, the total proportion of the multiple kinds of components E may fall within the above range in terms of active constituents.

Examples of the component E include a photo-polymerization initiator and a thermal polymerization initiator. The component E is preferably a photo-polymerization initiator. The photo-polymerization initiator is active to active energy rays, and is added so as to initiate a polymerization reaction for polymerizing monomers.

Examples of the photo-polymerization initiator include a radical polymerization initiator, an anionic polymerization initiator, and a cationic polymerization initiator. Examples of the photo-polymerization initiator include acetophenones such as p-tert-butyl trichloro acetophenone, 2,2'-diethoxy acetophenone, and 2-hydroxy-2-methyl-1-phenylpropan-1-one; ketones such as benzophenone, 4,4'-bis(dimethylamino)benzophenone, 2-chloro thioxanthone, 2-methyl thioxanthone, 2-ethyl thioxanthone, and 2-isopropyl thioxanthone; benzoin ethers such as benzoin, benzoin methyl ether, benzoin isopropyl ether, and benzoin isobutyl ether; benzyl ketals such as benzyl dimethyl ketal and hydroxy cyclohexyl phenyl ketone; acylphosphine oxides such as 2,4,6-trimethyl benzoyl-diphenyl-phosphineoxide and bis(2,4,6-trimethyl benzoyl)-phenyl phosphineoxide; and alkylphenones such as 1-hydroxy cyclohexyl phenyl ketone. Known examples of 2,4,6-trimethyl benzoyl-diphenyl-phosphineoxide include "Lucirin® TPO" and "Irgacure® TPO" available from BASF. Known examples of bis(2,4,6-trimethyl benzoyl)-phenyl phosphineoxide include "Irgacure 819" available from BASF. Known examples of 1-hydroxy cyclohexyl phenyl ketone include "Irgacure 184" available from BASF.

The polymerizable composition may further contain a solvent (component other than active constituents). In this case, the solvent may be involved in the components A to E with active constituents, or may be contained separately from the components A to E.

Examples of the solvent include alcohols (carbon number 1 to 10: e.g., methanol, ethanol, n- or i-propanol, n-, sec-, or t-butanol, benzyl alcohol, octanol), ketones (carbon number 3 to 8: e.g., acetone, methyl ethyl ketone, methyl isobutyl ketone, diisobutyl ketone, dibutyl ketone, cyclohexanone), esters or ether esters (carbon number 4 to 10: e.g., ethyl acetate, butyl acetate, ethyl lactate), γ-butyrolactone, ethylene glycol monomethyl acetate, propylene glycol monomethyl acetate, ethers (carbon number 4 to 10: e.g., EG monomethyl ether (methyl cellosolve), EG monoethyl ether (ethyl cellosolve), diethylene glycol monobutyl ether (butyl cellosolve), propylene glycol monomethyl ether), aromatic hydrocarbons (carbon number 6 to 10: e.g., benzene, toluene, xylene), amides (carbon number 3 to 10: e.g., dimethyl formamide, dimethyl acetamide, N-methylpyrrolidone), halogenated hydrocarbons (carbon number 1 to 2: e.g., methylene dichloride, ethylene dichloride), and petroleum solvents (e.g., petroleum ether, petroleum naphtha).

As mentioned, the present embodiment can achieve the antifouling film 1 excellent in all of antifouling performance, adhesiveness, rubbing resistance, and reliability.

In terms of achieving the antifouling performance, the polymer layer 3 includes a surface (surface opposite to the substrate 2) having a contact angle of water of preferably 130° or greater and a contact angle of hexadecane of preferably 30° or greater.

In terms of achieving the rubbing resistance, the polymer layer 3 includes a surface (surface opposite to the substrate 2) having a coefficient of dynamic friction of preferably 2.0 or lower, more preferably 1.5 or lower, still more preferably 1.0 or lower.

Application of the antifouling film 1 is not particularly limited as long as the excellent antifouling performance is exerted. The antifouling film 1 may be applied as an optical film such as an antireflection film, for example. Such an antireflection film, when attached to the inside or outside of a display device, contributively improves the visibility.

The antifouling performance of the antifouling film 1 may mean capability of easily removing dirt on the surface (surface opposite to the substrate 2) of the polymer layer 3 or may mean a tendency of not capturing dirt on the surface (surface opposite to the substrate 2) of the polymer layer 3.

Figure 3:
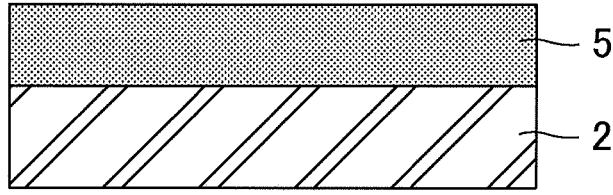
FIG. 3 includes schematic cross-sectional views for illustrating a method for producing an antifouling film of the embodiment.
Figure 3:
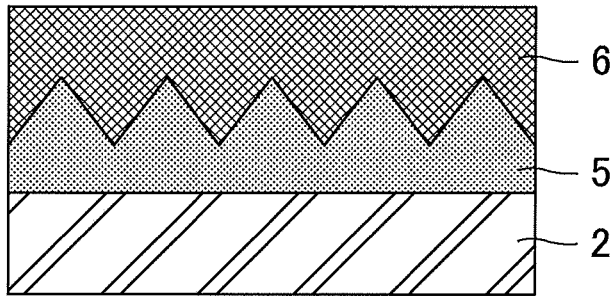
Figure 3:
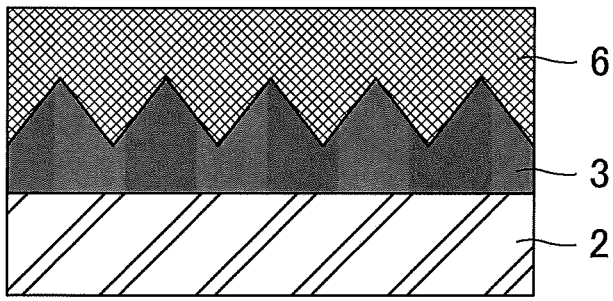
Figure 3:
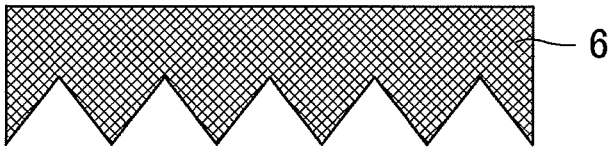
Figure 3:
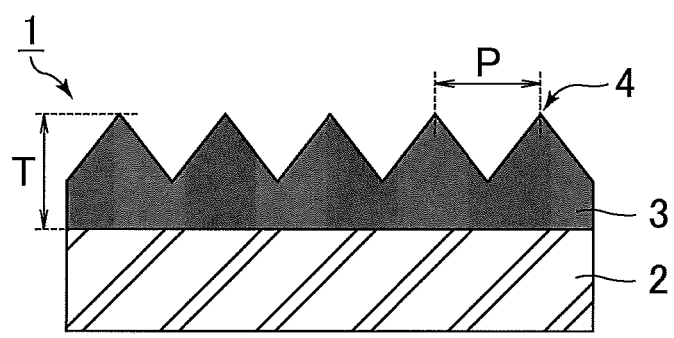

The antifouling film 1 is produced by the following production method, for example. FIG. 3 includes schematic cross-sectional views for illustrating a method for producing an antifouling film of the embodiment.

(Process (1): Application of Polymerizable Composition)

As shown in FIG. 3(a), a polymerizable composition 5 is applied to a surface of the substrate 2.

The polymerizable composition 5 may be applied by, for example, spraying, gravure coating, slot die coating, or bar coating. Preferably, the polymerizable composition 5 is applied by gravure coating or slot die coating in terms of achieving a uniform thickness and improving the productivity.

The polymerizable composition 5 contains the components A to E at the described proportions. When the polymerizable composition 5 further contains a solvent (component other than active constituents), the production method may include heat treatment (dry treatment) for removing the solvent after application of the polymerizable composition 5. The heat treatment is preferably performed at a temperature not lower than the boiling point of the solvent.

(Process (2): Formation of Uneven Structure)

As shown in FIG. 3(b), the substrate 2 is pushed to the die 6 with the polymerizable composition 5 in between. As a result, an uneven structure is formed on the surface (surface opposite to the substrate 2) of the polymerizable composition 5.

(Process (3): Curing of Polymerizable Composition)

The polymerizable composition 5 including an uneven structure on its surface is cured. As a result, the polymer layer 3 is formed as shown in FIG. 3(c).

The polymerizable composition 5 may be cured by, for example, active energy ray irradiation or heating. The polymerizable composition 5 is cured preferably by active energy ray irradiation, more preferably by ultraviolet ray irradiation. Active energy ray irradiation may be performed from the substrate 2 side of the polymerizable composition 5 or the die 6 side of the polymerizable composition 5. The active energy ray irradiation may be performed on the polymerizable composition 5 once or multiple times. Curing the polymerizable composition 5 (Process (3)) may be simultaneously performed with forming an uneven structure of the polymerizable composition 5 (Process (2)).

(Process (4): Release of Die)

As shown in FIG. 3(d), the die 6 is released from the polymer layer 3. As a result, the antifouling film 1 is completed.

In the above production processes, using a rolled substrate 2, for example, enables efficient and sequential performing of the processes (1) to (4).

The die 6 may be one produced by the following method. First, aluminum as a material for the die 6 is formed into a film on a surface of a supporting substrate by sputtering. Next, the resulting aluminum layer is repetitively subjected to anodizing and etching. Thereby, a cavity (die 6) with a moth-eye structure can be produced. At this time, the uneven structure of the die 6 can be modified by adjusting the duration of the anodizing and the duration of the etching.

Examples of the material for the supporting substrate include glass; metals such as stainless steel and nickel; polyolefin resins such as polypropylene, polymethylpentene, cyclic olefin polymers (typically, "Zeonor®" available from Zeon Corporation and "Ayton®" available from JSR Corporation, both of which are a norbornene resin); polycarbonate resins; and other resins such as polyethylene terephthalate, polyethylene naphthalate, and triacetyl cellulose. The supporting substrate provided with an aluminum film on its surface may be replaced by an aluminum substrate.

The die 6 may be in a shape of flat plate or roll, for example.

The surface of the die 6 has preferably undergone release treatment. Thereby, the die 6 can be easily released from the polymer layer 3. Also, the surface free energy of the die 6 is reduced. Thus, fluorine atoms in the component D can be uniformly distributed on the surface (surface opposite to the substrate 2) of the polymerizable composition 5 when the substrate 2 is pushed to the die 6 in Process (2). Furthermore, this treatment can prevent early separation of fluorine atoms in the component D from the surface (surface opposite to the substrate 2) of the polymerizable composition 5 before curing of the polymerizable composition 5. As a result, in the antifouling film 1, fluorine atoms in the component D can be uniformly distributed on the surface (surface opposite to the substrate 2) of the polymer layer 3.

Examples of the material used in the release treatment for the die 6 include fluorine-based materials, silicon-based materials, and phosphate-based materials. Known examples of the fluorine-based material include "Optool® DSX" available from Daikin Industries, Ltd. and "Optool AES4" available from Daikin Industries, Ltd.

Examples and Comparative Examples

The present invention is described in more detail below referring to examples and comparative examples. The examples, however, are not intended to limit the scope of the present invention.

The materials used for producing antifouling films in the examples and comparative examples were as follows.
(Substrate)
"TAC-TD80U" available from Fujifilm Corp. was used. The thickness thereof was 80 μm.
(Polymerizable Composition)
Polymerizable compositions R1 to R38 with the respective compositions as shown in Tables 1 to 13 were used. Abbreviations for the names of the components in the polymerizable compositions are as follows.

<Urethane Acrylate>
A1
"UA-306h" available from Kyoeisha Chemical Co., Ltd.
Number of functional groups: 6
Urethane acrylate component (active constituents): 70 wt %
Multifunctional acrylate component (active constituents): 30 wt %
A2
"KUA-9N" available from KSM Co., Ltd.
Number of functional groups: 9
Active constituents: 100 wt %
A3
"KUA-10N" available from KSM Co., Ltd.
Number of functional groups: 10
Active constituents: 100 wt %
A4
"KUA-15N" available from KSM Co., Ltd.
Number of functional groups: 15
Active constituents: 100 wt %
A5
"Ebecryl 4858" available from Daicel-Allnex Ltd.
Number of functional groups: 2
Active constituents: 100 wt %
A6
"Ebecryl 8465" available from Daicel-Allnex Ltd.
Number of functional groups: 3
Active constituents: 100 wt %
A7
"Ebecryl 8210" available from Daicel-Allnex Ltd.
Number of functional groups: 4
Active constituents: 100 wt %
<Multifunctional Acrylate>
B1
"ATM-35E" available from Shin-Nakamura Chemical Co., Ltd.
Number of functional groups: 4
Number of ethylene oxide groups: 8.75 for each functional group
Active constituents: 100 wt %
B2
"NK Economer A-PG5027E" available from Shin-Nakamura Chemical Co., Ltd.
Number of functional groups: 9
Number of ethylene oxide groups: 3 for each functional group
Active constituents: 100 wt %
B3
"NK Economer A-PG5054E" available from Shin-Nakamura Chemical Co., Ltd.
Number of functional groups: 9
Number of ethylene oxide groups: 6 for each functional group
Active constituents: 100 wt %
B4
"A-600" available from Shin-Nakamura Chemical Co., Ltd.
Number of functional groups: 2
Number of ethylene oxide groups: 7 for each functional group
Active constituents: 100 wt %
B5
"A-TMPT-9EO" available from Shin-Nakamura Chemical Co., Ltd.
Number of functional groups: 3
Number of ethylene oxide groups: 3 for each functional group Active constituents: 100 wt %
B6
"AT-30E" available from Shin-Nakamura Chemical Co., Ltd.
Number of functional groups: 3
Number of ethylene oxide groups: 10 for each functional group
Active constituents: 100 wt %
B7
"Kayarad® DPEA-12" available from Nippon Kayaku Co., Ltd.
Number of functional groups: 6
Number of ethylene oxide groups: 2 for each functional group
Active constituents: 100 wt %

<Monofunctional Acrylate>
C1
"Viscoat #150" available from Osaka Organic Chemical Industry Ltd.
Ethylene oxide group: absent
Active constituents: 100 wt %
C2
"ACMO" available from KJ Chemicals Corporation
Ethylene oxide group: absent
Active constituents: 100 wt %
C3
"DMAA" available from KJ Chemicals Corporation
Ethylene oxide group: absent
Active constituents: 100 wt %
C4
"AM-90G" available from Shin-Nakamura Chemical Co., Ltd.
Ethylene oxide group: present
Active constituents: 100 wt %

<Release Agent>
D1
"Fomblin MT70" available from Solvay
Perfluoropolyether group: present
Fluorine atom concentration: 43 wt %
Active constituents: 80 wt %
D2
"Fomblin AD1700" available from Solvay
Perfluoropolyether group: present
Fluorine atom concentration: 24 wt %
Active constituents: 70 wt %
D3
"Fomblin MD700" available from Solvay
Perfluoropolyether group: present
Fluorine atom concentration: 52 wt %
Active constituents: 100 wt %
D4
"BYK®-UV3575" available from BYK Additives & Instruments
Perfluoropolyether group: absent (silicon-based release agent)
Active constituents: 50 wt %
D5
"X-22-2445" available from Shin-Etsu Chemical Co., Ltd.
Perfluoropolyether group: absent (silicon-based release agent)
Active constituents: 100 wt %
D6
"TEGO®Rad 2700" available from Evonik
Perfluoropolyether group: absent (silicon-based release agent)
Active constituents: 100 wt %
D7
"FM-0711" available from JNC
Perfluoropolyether group: absent (silicon-based release agent)
Active constituents: 100 wt %
D8
"Cheminox® FAAC-6" available from Unimatec Corporation
Perfluoropolyether group: absent (containing a perfluoro alkyl group)
Active constituents: 100 wt %
D9
"Ftergent® 601AD" available from Neos Co., Ltd.
Perfluoropolyether group: absent (containing a perfluoro alkyl group)
Active constituents: 25 wt %
D10
"Megaface® RS-76-NS" available from DIC Corporation
Perfluoropolyether group: absent (containing a perfluoro alkyl group)
Active constituents: 20 wt %

<Polymerization Initiator>
E1
"Lucirin TPO" available from BASF
Active constituents: 100 wt %

The "percentage of active constituents" in Tables 1 to 13 represents the proportion of each component (e.g. urethane acrylate) in the polymerizable composition in terms of active constituents, i.e., the proportion (unit: wt %) of active constituents in each component in the entire amount (100 wt %) of active constituents in the polymerizable composition. In the polymerizable composition R2, the proportion of the multifunctional acrylate not belonging to the component B (category: other component) is 8.1 wt % in terms of active constituents. This is the percentage of active constituents of the multifunctional acrylate component contained in the urethane acrylate A1. In the polymerizable composition R19, the proportion of the multifunctional acrylate not belonging to the component B (category: other component) is 5.4 wt % in terms of active constituents. This is the percentage of active constituents of the multifunctional acrylate component contained in the urethane acrylate A1.

TABLE 1

| | | | Polymerizable composition | | | | | |
|---|---|---|---|---|---|---|---|---|
| | | | R1 | | R2 | | R3 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | 27 | 18.9 | — | 27 |
| | | A2 | — | | — | | 27 | |

TABLE 1-continued

| Component | Category | Abbreviation | Polymerizable composition | | | | | |
|---|---|---|---|---|---|---|---|---|
| | | | R1 | | R2 | | R3 | |
| | | | Amount (parts by weight) | Percentage of active constituents (wt %) | Amount (parts by weight) | Percentage of active constituents (wt %) | Amount (parts by weight) | Percentage of active constituents (wt %) |
| | | A3 | 27 | — | — | | — | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 49 | — | 49 | — | 49 |
| | | B2 | — | | — | | — | |
| | | B3 | 49 | | 49 | | 49 | |
| | Other component | B4 | — | 0 | — | 8.1 | — | 0 |
| | | B5 | — | | — | | — | |
| | | B6 | — | | — | | — | |
| | | B7 | — | | — | | — | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 2

| Component | Category | Abbreviation | Polymerizable composition | | | | | |
|---|---|---|---|---|---|---|---|---|
| | | | R4 | | R5 | | R6 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | — | 40 | — | 27 |
| | | A2 | — | | — | | — | |
| | | A3 | — | | 40 | | 27 | |
| | | A4 | 27 | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 49 | — | 36 | 49 | 49 |
| | | B2 | — | | — | | — | |
| | | B3 | 49 | | 36 | | — | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |

TABLE 2-continued

| | | | Polymerizable composition | | | | | |
|---|---|---|---|---|---|---|---|---|
| | | | R4 | | R5 | | R6 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
| Polymerization initiator | Component E | E1 | 2 | 2 | 2 | 2 | 2 | 2 |

TABLE 3

| | | | Polymerizable composition | | | | | |
|---|---|---|---|---|---|---|---|---|
| | | | R7 | | R8 | | R9 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | — | 17 | — | 27 |
| | | A2 | — | | — | | — | |
| | | A3 | 27 | | 17 | | 27 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 49 | — | 59 | — | 49 |
| | | B2 | 49 | | — | | — | |
| | | B3 | — | | 59 | | 49 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 20 | 20 | 20 |
| | | C2 | — | | — | | — | |
| | | C3 | 20 | | 20 | | — | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 4

| | | | Polymerizable composition | | | | | |
|---|---|---|---|---|---|---|---|---|
| | | | R10 | | R11 | | R12 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | — | 30 | — | 25 |
| | | A2 | — | | — | | — | |
| | | A3 | 27 | | 30 | | 25 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 49 | — | 50 | — | 42 |
| | | B2 | — | | — | | — | |
| | | B3 | 49 | | 50 | | 42 | |

TABLE 4-continued

| Component | Category | Abbreviation | Polymerizable composition | | | | | |
|---|---|---|---|---|---|---|---|---|
| | | | R10 | | R11 | | R12 | |
| | | | Amount (parts by weight) | Percentage of active constituents (wt %) | Amount (parts by weight) | Percentage of active constituents (wt %) | Amount (parts by weight) | Percentage of active constituents (wt %) |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 16 | — | 29 |
| | | C2 | 20 | | — | | — | |
| | | C3 | — | | 16 | | 29 | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 5

| Component | Category | Abbreviation | Polymerizable composition | | | | | |
|---|---|---|---|---|---|---|---|---|
| | | | R13 | | R14 | | R15 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | — | 27 | — | 25 |
| | | A2 | — | | — | | — | |
| | | A3 | 27 | | 27 | | 25 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 49 | — | 49 | — | 43 |
| | | B2 | — | | — | | — | |
| | | B3 | 49 | | 49 | | 43 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 21.5 | — | 20 |
| | | C2 | — | | — | | — | |
| | | C3 | 20 | | 21.5 | | 20 | |
| | Other component | C4 | — | 0 | — | 0 | — | 0 |
| Release agent | Component D | D1 | — | 2 | 0.625 | 0.5 | 12.5 | 10 |
| | | D2 | 2.86 | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 6

| Component | Category | Abbreviation | Polymerizable composition | | | | | |
|---|---|---|---|---|---|---|---|---|
| | | | R16 | | R17 | | R18 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 0 | — | 0 | — | 0 |
| | | A2 | — | | — | | — | |
| | | A3 | — | | — | | — | |
| | | A4 | — | | — | | — | |
| | Other component | A5 | 27 | 27 | — | 27 | — | 27 |
| | | A6 | — | | 27 | | — | |
| | | A7 | — | | — | | 27 | |
| Multifunctional acrylate | Component B | B1 | — | 49 | — | 49 | — | 49 |
| | | B2 | — | | — | | — | |
| | | B3 | 49 | | 49 | | 49 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 7

| Component | Category | Abbreviation | Polymerizable composition | | | | | |
|---|---|---|---|---|---|---|---|---|
| | | | R19 | | R20 | | R21 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | 18 | 12.6 | — | 42 | — | 27 |
| | | A2 | — | | — | | — | |
| | | A3 | — | | 42 | | 27 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 58 | — | 34 | — | 0 |
| | | B2 | — | | — | | — | |
| | | B3 | 58 | | 34 | | — | |
| | Other component | B4 | — | 5.4 | — | 0 | 49 | 49 |
| | | B5 | — | | — | | — | |
| | | B6 | — | | — | | — | |
| | | B7 | — | | — | | — | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |

TABLE 7-continued

| Component | Category | Abbreviation | Polymerizable composition | | | | | |
|---|---|---|---|---|---|---|---|---|
| | | | R19 | | R20 | | R21 | |
| | | | Amount (parts by weight) | Percentage of active constituents (wt %) | Amount (parts by weight) | Percentage of active constituents (wt %) | Amount (parts by weight) | Percentage of active constituents (wt %) |
| | | D9 | — | | — | | — | |
| | | D10 | — | | — | | — | |
| Polymerization initiator | Component E | E1 | 2 | 2 | 2 | 2 | 2 | 2 |

TABLE 8

| Component | Category | Abbreviation | Polymerizable composition | | | | | |
|---|---|---|---|---|---|---|---|---|
| | | | R22 | | R23 | | R24 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | — | 27 | — | 27 |
| | | A2 | — | | — | | — | |
| | | A3 | 27 | | 27 | | 27 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 0 | — | 0 | — | 0 |
| | | B2 | — | | — | | — | |
| | | B3 | — | | — | | — | |
| | Other component | B4 | — | 49 | — | 49 | — | 49 |
| | | B5 | 49 | | — | | — | |
| | | B6 | — | | 49 | | — | |
| | | B7 | — | | — | | 49 | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 9

| Component | Category | Abbreviation | Polymerizable composition | | | | | |
|---|---|---|---|---|---|---|---|---|
| | | | R25 | | R26 | | R27 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 14 | — | 27 | — | 32 |
| | | A2 | — | | — | | — | |
| | | A3 | 14 | | 27 | | 32 | |
| | | A4 | — | | — | | — | |
| | Other component | A5 | — | 0 | — | 0 | — | 0 |
| | | A6 | — | | — | | — | |
| | | A7 | — | | — | | — | |

TABLE 9-continued

| | | | Polymerizable composition | | | | | |
| | | | R25 | | R26 | | R27 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
|---|---|---|---|---|---|---|---|---|
| Multifunctional acrylate | Component B | B1 | — | 62 | — | 49 | — | 50 |
| | | B2 | — | | — | | — | |
| | | B3 | 62 | | 49 | | 50 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 0 | — | 14 |
| | | C2 | — | | — | | — | |
| | | C3 | 20 | | — | | 14 | |
| | Other component | C4 | — | 0 | 20 | 20 | — | 0 |
| Release agent | Component D | D1 | 2.5 | 2 | 2.5 | 2 | 2.5 | 2 |
| | | D2 | — | | — | | — | |
| | Other component | D3 | — | 0 | — | 0 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 10

| | | | Polymerizable composition | | | | | |
| | | | R28 | | R29 | | R30 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
|---|---|---|---|---|---|---|---|---|
| Urethane acrylate | Component A | A1 | — | 24 | — | 27 | — | 27 |
| | | A2 | — | | — | | — | |
| | | A3 | 24 | | 27 | | 27 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 40 | — | 49 | — | 49 |
| | | B2 | — | | — | | — | |
| | | B3 | 40 | | 49 | | 49 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 32 | — | 20 | — | 22 |
| | | C2 | — | | — | | — | |
| | | C3 | 32 | | 20 | | 22 | |
| | Other component | C4 | — | 0 | — | 0 | — | 0 |
| Release agent | Component D | D1 | 2.5 | 2 | — | 0 | — | 0 |
| | | D2 | — | | — | | — | |
| | Other component | D3 | — | 0 | 2 | 2 | — | 0 |
| | | D4 | — | | — | | — | |
| | | D5 | — | | — | | — | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 11

| Component | Category | Abbreviation | Polymerizable composition | | | | | |
|---|---|---|---|---|---|---|---|---|
| | | | R31 | | R32 | | R33 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 25 | — | 27 | — | 27 |
| | | A2 | — | | — | | — | |
| | | A3 | 25 | | 27 | | 27 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 41 | — | 49 | — | 49 |
| | | B2 | — | | — | | — | |
| | | B3 | 41 | | 49 | | 49 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | 15 | 12 | — | 0 | — | 0 |
| | | D2 | — | | — | | — | |
| | Other component | D3 | — | 0 | — | 2 | — | 2 |
| | | D4 | — | | 4 | | — | |
| | | D5 | — | | — | | 2 | |
| | | D6 | — | | — | | — | |
| | | D7 | — | | — | | — | |
| | | D8 | — | | — | | — | |
| | | D9 | — | | — | | — | |
| | | D10 | — | | — | | — | |
| Polymerization initiator | Component E | E1 | 2 | 2 | 2 | 2 | 2 | 2 |

TABLE 12

| Component | Category | Abbreviation | Polymerizable composition | | | | | |
|---|---|---|---|---|---|---|---|---|
| | | | R34 | | R35 | | R36 | |
| | | | Amount (parts by weight) | Percentage of active constituents (wt %) | Amount (parts by weight) | Percentage of active constituents (wt %) | Amount (parts by weight) | Percentage of active constituents (wt %) |
| Urethane acrylate | Component A | A1 | — | 27 | — | 27 | — | 27 |
| | | A2 | — | | — | | — | |
| | | A3 | 27 | | 27 | | 27 | |
| | | A4 | — | | — | | — | |
| | Other component | A5 | — | 0 | — | 0 | — | 0 |
| | | A6 | — | | — | | — | |
| | | A7 | — | | — | | — | |
| Multifunctional acrylate | Component B | B1 | — | 49 | — | 49 | — | 49 |
| | | B2 | — | | — | | — | |
| | | B3 | 49 | | 49 | | 49 | |
| | Other component | B4 | — | 0 | — | 0 | — | 0 |
| | | B5 | — | | — | | — | |
| | | B6 | — | | — | | — | |
| | | B7 | — | | — | | — | |
| Monofunctional acrylate | Component C | C1 | — | 20 | — | 20 | — | 20 |
| | | C2 | — | | — | | — | |
| | | C3 | 20 | | 20 | | 20 | |
| | Other component | C4 | — | 0 | — | 0 | — | 0 |
| Release agent | Component D | D1 | — | 0 | — | 0 | — | 0 |
| | | D2 | — | | — | | — | |
| | Other component | D3 | — | 2 | — | 2 | — | 2 |
| | | D4 | — | | — | | — | |
| | | D5 | — | | — | | — | |
| | | D6 | 2 | | — | | — | |
| | | D7 | — | | 2 | | — | |
| | | D8 | — | | — | | 2 | |

TABLE 12-continued

| | | | Polymerizable composition | | | | | |
|---|---|---|---|---|---|---|---|---|
| | | | R34 | | R35 | | R36 | |
| Component | Category | Abbreviation | Amount (parts by weight) | Percentage of active constituents (wt %) | Amount (parts by weight) | Percentage of active constituents (wt %) | Amount (parts by weight) | Percentage of active constituents (wt %) |
| | | D9 | — | | — | | — | |
| | | D10 | — | | — | | — | |
| Polymerization initiator | Component E | E1 | 2 | 2 | 2 | 2 | 2 | 2 |

TABLE 13

| | | | Polymerizable composition | | | |
|---|---|---|---|---|---|---|
| | | | R37 | | R38 | |
| Component | Category | Abbreviation | Amount (parts by weight) | Percentage of active constituents (wt %) | Amount (parts by weight) | Percentage of active constituents (wt %) |
| Urethane acrylate | Component A | A1 | — | 27 | — | 27 |
| | | A2 | — | | — | |
| | | A3 | 27 | | 27 | |
| | | A4 | — | | — | |
| | Other component | A5 | — | 0 | — | 0 |
| | | A6 | — | | — | |
| | | A7 | — | | — | |
| Multifunctional acrylate | Component B | B1 | — | 49 | — | 49 |
| | | B2 | — | | — | |
| | | B3 | 49 | | 49 | |
| | Other component | B4 | — | 0 | — | 0 |
| | | B5 | — | | — | |
| | | B6 | — | | — | |
| | | B7 | — | | — | |
| Monofunctional acrylate | Component C | C1 | — | 20 | — | 20 |
| | | C2 | — | | — | |
| | | C3 | 20 | | 20 | |
| | Other component | C4 | — | 0 | — | 0 |
| Release agent | Component D | D1 | — | 0 | — | 0 |
| | | D2 | — | | — | |
| | Other component | D3 | — | 2 | — | 2 |
| | | D4 | — | | — | |
| | | D5 | — | | — | |
| | | D6 | — | | — | |
| | | D7 | — | | — | |
| | | D8 | — | | — | |
| | | D9 | 8 | | — | |
| | | D10 | — | | 10 | |
| Polymerization initiator | Component E | E1 | 2 | 2 | 2 | 2 |

(Die)

A die produced by the following method was used. First, a film of aluminum as a material for the die was formed on a 10-cm square glass substrate by sputtering. The resulting aluminum layer had a thickness of 1.0 μm. Next, the resulting aluminum layer was repetitively subjected to anodizing and etching. Thereby, an anodizing layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum layer (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was subjected to scanning electron microscopic observation to be found to have a recess depth of 290 nm. The surface of the die had undergone release treatment with "Optool AES4" available from Daikin Industries, Ltd.

Example 1

An antifouling film of Example 1 was produced by the following production method.

(Process (1): Application of Polymerizable Composition)

The polymerizable composition R1 was dropped on (applied to) a surface of the substrate 2 in a stripe pattern. The polymerizable composition R1 was spread on the whole surface of the substrate 2 with a bar coater. The resulting workpiece, having the polymerizable composition R1 applied to the surface of the substrate 2, was put into an oven and heated at a temperature of 80° C. for one minute, whereby the solvent was volatilized from the polymerizable composition R1.
(Process (2): Formation of Uneven Structure)

The substrate 2 was pushed to the die 6 using a hand roller with the polymerizable composition R1 (after solvent volatilization) in between. As a result, an uneven structure was formed on the surface (surface opposite to the substrate 2) of the polymerizable composition R1.
(Process (3): Curing of Polymerizable Composition)

The polymerizable composition R1 having an uneven structure on its surface was irradiated with ultraviolet rays (irradiation dose: 200 mJ/cm$^2$) from the substrate 2 side to be cured. As a result, the polymer layer 3 was formed.
(Process (4): Release of Die)

The die 6 was released from the polymer layer 3. Thereby, the antifouling film 1 was completed. The thickness T of the polymer layer 3 was 9.8 μm.

The surface specifications of the antifouling film 1 were as follows.
 Shape of projections 4: temple-bell-like shape
 Average pitch of projections 4: 200 nm
 Average height of projections 4: 200 nm
 Average aspect ratio of projections 4: 1.0

The surface specifications of the antifouling film 1 were evaluated using a scanning electron microscope "S-4700" (Hitachi High-Technologies Corp.). For the evaluation, osmium(VIII) oxide available from Wako Pure Chemical Industries, Ltd. was applied (thickness: 5 nm) to the surface (surface opposite to the substrate 2) of the polymer layer 3 using an osmium coater "Neoc-ST" available from Meiwafosis Co., Ltd.

Examples 2 to 15 and Comparative Examples 1 to 23

An antifouling film of each example/comparative example was produced as in Example 1 except that the composition of the polymerizable composition was changed as shown in Tables 14 to 21.
[Evaluation]

The antifouling film of each example/comparative example was subjected to the following evaluations. The results are shown in Tables 14 to 21.
(Transparency of Polymerizable Composition)

The polymerizable composition (before heat treatment) used in each example/comparative example was charged in a transparent test tube and the state thereof was visually observed at an illuminance of 100 1× (under a fluorescent lamp). Evaluation criteria were as follows.
 Good: The composition was transparent or very slightly white turbid.
 Fair: The composition was slightly white turbid but no sediment was observed after one day leaving.
 Poor: The composition was white turbid and sediment was observed after one day leaving.

Higher transparency of the polymerizable composition was evaluated to show higher compatibility of the release agent in the polymerizable composition.
(Antifouling Performance)

Antifouling performance was evaluated in view of water repellency, oil repellency, and fingerprint wiping performance.

Water repellency was evaluated from the contact angle of water on the surface of the antifouling film of each example/comparative example. Specifically, water was dropped on the surface (surface opposite to the substrate) of the polymer layer of the antifouling film of each example/comparative example, and the contact angle immediately after the dropping was measured.

Oil repellency was evaluated from the contact angle of hexadecane on the surface of the antifouling film of each example/comparative example. Specifically, hexadecane was dropped on the surface (surface opposite to the substrate) of the polymer layer of the antifouling film of each example/comparative example, and the contact angle immediately after the dropping was measured.

The contact angle was determined by averaging contact angles at the following three spots measured with a portable contact angle meter "PCA-1" available from Kyowa Interface Science Co., Ltd. using the θ/2 method (θ/2=arc tan(h/r), θ: contact angle, r: radius of droplet, h: height of droplet). A first measurement spot was a center portion of the antifouling film of each example/comparative example. Second and third measurement spots were two spots that were each 20 mm or more away from the first measurement spot and were spots symmetrical with each other with respect to the first measurement spot.

Fingerprint wiping performance was determined by the following method. A black acrylic plate was attached to the antifouling film of each example/comparative example on the surface opposite to the polymer layer of the substrate via an optical adhesive layer. Then, fingerprints were made on the surface (surface opposite to the substrate) of the polymer layer of the antifouling film of each example/comparative example. The fingerprints were then reciprocally rubbed 10 times with "Bemcot® S-2" available from Asahi Kasei Corp. Whether the fingerprints had been wiped off or not was visually observed at an illuminance of 100 1× (under a fluorescent lamp). Evaluation criteria were as follows.
 Good: The fingerprints were completely wiped off and no wiping residue was observed.
 Fair: The fingerprints were not obvious, but slight wiping residue was observed when the light from a fluorescent lamp was reflected on the surface.
 Poor: The fingerprints were not wiped off at all.

The case of good or fair was evaluated as allowable (having excellent fingerprint wiping performance).
(Adhesiveness)

Adhesiveness was determined by the following method. The surface (surface opposite to the substrate) of the polymer layer of the antifouling film of each example/comparative example was cut with a utility knife so as to have a grid pattern of 11 vertical linear cuts and 11 horizontal linear cuts at an interval of 1 mm, whereby 100 squares (1-mm squares) were marked on the surface. Then, a polyester pressure-sensitive adhesive tape "No. 31B" available from Nitto Denko Corporation was attached to the squares with pressure. The pressure-sensitive adhesive tape was peeled at a speed of 100 mm/s in the direction of 90° with respect to the surfaces of the squares. The peeled state of the polymer layer on the substrate was visually observed. The number "M" (unit: piece) of squares of the polymer layer remaining on the substrate was counted. Evaluation criteria were as follows.
 Good: M=100
 Fair: M=95 to 99
 Poor: M=0 to 94

The case of good or fair was evaluated as allowable (having excellent adhesiveness).

(Rubbing Resistance)

Rubbing resistance was evaluated in view of smoothness and steel wool resistance.

Smoothness was evaluated from the coefficient of dynamic friction of the surface of the antifouling film of each example/comparative example. Specifically, the antifouling film of each example/comparative example was fixed on a stage of a surface property tester "Heidon®-14FW" available from Shinto Scientific Co., Ltd. and the horizontal state was confirmed. The surface (surface opposite to the substrate) of the polymer layer of the antifouling film of each example/comparative example was rubbed for a 20-mm distance with a probe placed on the surface with a load of 400 g. Then, a stable part of the obtained chart was extracted and the coefficient of dynamic friction was calculated.

Steel wool resistance was evaluated by the following method. The surface (surface opposite to the substrate) of the polymer layer of the antifouling film of each example/comparative example was rubbed with a steel wool "#0000" available from Nihon Steel Wool Co., Ltd. with a load of 400 g. The surface (surface opposite to the substrate) of the polymer layer of the antifouling film of each example/comparative example was visually observed at an illuminance of 100 1x (under a fluorescent lamp) and the number "N" of scratches was counted. The steel wool rubbing was performed with a surface property tester "Heidon-14FW" available from Shinto Scientific Co., Ltd. as a tester at a stroke width of 30 mm and a speed of 100 mm/s, and the surface was reciprocally rubbed 10 times.

Evaluation criteria were as follows.
Excellent: N=0
Good: N=1 to 3
Fair: N=4 to 10
Poor: N=11 to 20
Bad: N≥21

The case of excellent, good, or fair was evaluated as allowable (having excellent steel wool resistance).

(Reliability)

Reliability was evaluated from the bleed out state of the antifouling film of each example/comparative example. Specifically, the antifouling film of each example/comparative example was subjected to a high temperature/high humidity test at a temperature of 60° C., a humidity of 95%, and leaving time of 1000 hours. The polymer layer of the antifouling film of each example/comparative example was visually observed at an illuminance of 100 1x (under a fluorescent lamp) for confirming the state of white turbidity. Through the visual observation, a polymer layer without white turbidity was determined to have no bleed out and evaluated as having good reliability. In contrast, a polymer layer with white turbidity was determined to have bleed out and evaluated as having poor reliability. When evaluation through the visual observation was difficult, the reliability was evaluated from presence or absence of difference between superimposed specular reflection spectra of light incident at an angle of 5° measured before and after the high temperature/high humidity test. Specifically, the reflectances of the spectra were compared before and after the high temperature/high humidity test. The case with absence of difference between the reflectances was evaluated as having good reliability while the case with presence of difference between the reflactances (in the case where the reflectance entirely increased after the high temperature/high humidity test) was evaluated as having poor reliability. A specular reflection spectrum of light incident at an angle of 5° was measured as follows. A black acrylic plate was attached to the antifouling film of each example/comparative example on the surface opposite to the polymer layer of the substrate. The surface (surface opposite to the substrate) of the polymer layer of the antifouling film of each example/comparative example was irradiated using a light source from an azimuth at a polar angle of 5°. Then, the specular reflection spectrum in a wavelength range from 380 to 780 nm was measured with a spectrophotometer "UV-3100PC" available from Shimadzu Corporation.

TABLE 14

| | | | Example 1 | Example 2 | Example 3 | Example 4 | Example 5 |
|---|---|---|---|---|---|---|---|
| | Polymerizable composition | | R1 | R2 | R3 | R4 | R5 |
| | Transparency of polymerizable composition | | Good | Good | Good | Good | Good |
| Antifouling performance | Water repellency | Contact angle of water (°) | 155 | 153 | 156 | 157 | 157 |
| | Oil repellency | Contact angle of hexadecane (°) | 85 | 84 | 86 | 85 | 86 |
| | Fingerprints wiping performance | | Good | Good | Good | Good | Good |
| | Adhesiveness | | Good | Good | Good | Good | Good |
| Rubbing resistance | Smoothness | Coefficient of dynamic friction | 1.2 | 1.3 | 1.2 | 1.2 | 1.4 |
| | Steel wool resistance | | Excellent | Fair | Good | Excellent | Fair |
| | Reliability | | Good | Good | Good | Good | Good |

TABLE 15

| | | | Example 6 | Example 7 | Example 8 | Example 9 | Example 10 |
|---|---|---|---|---|---|---|---|
| | Polymerizable composition | | R6 | R7 | R8 | R9 | R10 |
| | Transparency of polymerizable composition | | Good | Good | Good | Good | Good |
| Antifouling performance | Water repellency | Contact angle of water (°) | 159 | 154 | 159 | 155 | 156 |
| | Oil repellency | Contact angle of hexadecane (°) | 88 | 83 | 89 | 84 | 87 |
| | Fingerprints wiping performance | | Good | Good | Good | Good | Good |
| | Adhesiveness | | Good | Good | Good | Fair | Good |

TABLE 15-continued

|  |  |  | Example 6 | Example 7 | Example 8 | Example 9 | Example 10 |
|---|---|---|---|---|---|---|---|
| Rubbing resistance | Smoothness | Coefficient of dynamic friction | 1.1 | 1.5 | 1.1 | 1.5 | 1.3 |
|  |  | Steel wool resistance | Fair | Fair | Good | Excellent | Excellent |
|  |  | Reliability | Good | Good | Good | Good | Good |

TABLE 16

|  |  |  | Example 11 | Example 12 | Example 13 | Example 14 | Example 15 |
|---|---|---|---|---|---|---|---|
|  | Polymerizable composition |  | R11 | R12 | R13 | R14 | R15 |
|  | Transparency of polymerizable composition |  | Fair | Good | Good | Good | Fair |
| Antifouling performance | Water repellency | Contact angle of water (°) | 154 | 153 | 141 | 134 | 160 |
|  | Oil repellency | Contact angle of hexadecane (°) | 80 | 83 | 65 | 38 | 90 |
|  |  | Fingerprints wiping performance | Good | Good | Fair | Fair | Good |
|  |  | Adhesiveness | Fair | Good | Good | Good | Good |
| Rubbing resistance | Smoothness | Coefficient of dynamic friction | 1.5 | 1.4 | 1.8 | 1.9 | 0.9 |
|  |  | Steel wool resistance | Excellent | Fair | Good | Fair | Fair |
|  |  | Reliability | Good | Good | Good | Good | Good |

TABLE 17

|  |  |  | Comparative Example 1 | Comparative Example 2 | Comparative Example 3 | Comparative Example 4 | Comparative Example 5 |
|---|---|---|---|---|---|---|---|
|  | Polymerizable composition |  | R16 | R17 | R18 | R19 | R20 |
|  | Transparency of polymerizable composition |  | Good | Good | Good | Good | Good |
| Antifouling performance | Water repellency | Contact angle of water (°) | 154 | 155 | 153 | 155 | 150 |
|  | Oil repellency | Contact angle of hexadecane (°) | 84 | 86 | 85 | 87 | 78 |
|  |  | Fingerprints wiping performance | Good | Good | Good | Good | Good |
|  |  | Adhesiveness | Good | Good | Good | Fair | Good |
| Rubbing resistance | Smoothness | Coefficient of dynamic friction | 1.4 | 1.5 | 1.6 | 1.2 | 1.7 |
|  |  | Steel wool resistance | Poor | Poor | Poor | Poor | Poor |
|  |  | Reliability | Good | Good | Good | Good | Good |

TABLE 18

|  |  |  | Comparative Example 6 | Comparative Example 7 | Comparative Example 8 | Comparative Example 9 | Comparative Example 10 |
|---|---|---|---|---|---|---|---|
|  | Polymerizable composition |  | R21 | R22 | R23 | R24 | R25 |
|  | Transparency of polymerizable composition |  | Good | Good | Good | Good | Good |
| Antifouling performance | Water repellency | Contact angle of water (°) | 155 | 156 | 154 | 155 | 158 |
|  | Oil repellency | Contact angle of hexadecane (°) | 84 | 82 | 80 | 82 | 85 |
|  |  | Fingerprints wiping performance | Good | Good | Good | Good | Good |
|  |  | Adhesiveness | Good | Good | Good | Good | Fair |
| Rubbing resistance | Smoothness | Coefficient of dynamic friction | 1.4 | 1.5 | 1.6 | 1.7 | 1.3 |
|  |  | Steel wool resistance | Poor | Poor | Poor | Poor | Bad |
|  |  | Reliability | Good | Good | Good | Good | Good |

TABLE 19

|  |  |  | Comparative Example 11 | Comparative Example 12 | Comparative Example 13 | Comparative Example 14 | Comparative Example 15 |
|---|---|---|---|---|---|---|---|
|  | Polymerizable composition |  | R26 | R27 | R28 | R29 | R30 |
|  | Transparency of polymerizable composition |  | Poor | Fair | Good | Poor | Good |
| Antifouling performance | Water repellency | Contact angle of water (°) | 124 | 140 | 153 | 98 | 18 |
|  | Oil repellency | Contact angle of hexadecane (°) | 24 | 58 | 87 | 21 | 8 |
|  |  | Fingerprints wiping performance | Poor | Good | Good | Poor | Poor |
|  |  | Adhesiveness | Poor | Poor | Good | Good | Good |

TABLE 19-continued

|  |  |  | Comparative Example 11 | Comparative Example 12 | Comparative Example 13 | Comparative Example 14 | Comparative Example 15 |
|---|---|---|---|---|---|---|---|
| Rubbing resistance | Smoothness | Coefficient of dynamic friction | 1.3 | 1.8 | 1.3 | 2.4 | 3.3 |
|  |  | Steel wool resistance | Poor | Good | Poor | Poor | Bad |
|  |  | Reliability | Good | Good | Good | Poor | Good |

TABLE 20

|  |  |  | Comparative Example 16 | Comparative Example 17 | Comparative Example 18 | Comparative Example 19 | Comparative Example 20 |
|---|---|---|---|---|---|---|---|
| Polymerizable composition |  |  | R31 | R32 | R33 | R34 | R35 |
| Transparency of polymerizable composition |  |  | Fair | Good | Poor | Poor | Poor |
| Antifouling performance | Water repellency | Contact angle of water (°) | 160 | 80 | 27 | 25 | 29 |
|  | Oil repellency | Contact angle of hexadecane (°) | 92 | 18 | 13 | 15 | 14 |
|  |  | Fingerprints wiping performance | Good | Poor | Poor | Poor | Poor |
|  |  | Adhesiveness | Good | Good | Good | Good | Good |
| Rubbing resistance | Smoothness | Coefficient of dynamic friction | 0.8 | 1.1 | 3.0 | 2.8 | 2.8 |
|  |  | Steel wool resistance | Poor | Excellent | Bad | Bad | Bad |
|  |  | Reliability | Poor | Good | Poor | Poor | Poor |

|  |  |  | Comparative Example 21 | Comparative Example 22 | Comparative Example 23 |
|---|---|---|---|---|---|
| Polymerizable composition |  |  | R36 | R37 | R38 |
| Transparency of polymerizable composition |  |  | Good | Good | Good |
| Antifouling performance | Water repellency | Contact angle of water (°) | 104 | 114 | 117 |
|  | Oil repellency | Contact angle of hexadecane (°) | 33 | 37 | 36 |
|  |  | Fingerprints wiping performance | Fair | Fair | Fair |
|  |  | Adhesiveness | Good | Good | Good |
| Rubbing resistance | Smoothness | Coefficient of dynamic friction | 2.5 | 2.6 | 2.5 |
|  |  | Steel wool resistance | Poor | Poor | Poor |
|  |  | Reliability | Good | Good | Good |

As shown in Tables 14 to 16, the films of Examples 1 to 15 were each excellent in all of antifouling performance, adhesiveness, rubbing resistance, and reliability. Meanwhile, as shown in Tables 17 to 21, the films of Comparative Examples 1 to 23 were each insufficient in at least one selected from the group consisting of antifouling performance, adhesiveness, rubbing resistance, and reliability.

The film of Comparative Example 1, which contained the urethane acrylate A5 containing less than six functional groups in the polymerizable composition R16, had insufficient rubbing resistance (steel wool resistance).

The film of Comparative Example 2, which contained the urethane acrylate A6 containing less than six functional groups in the polymerizable composition R17, had insufficient rubbing resistance (steel wool resistance).

The film of Comparative Example 3, which contained the urethane acrylate A7 containing less than six functional groups in the polymerizable composition R18, had insufficient rubbing resistance (steel wool resistance).

The film of Comparative Example 4, which contained, in the polymerizable composition R19, less than 15 wt % of the proportion of a urethane acrylate component derived from the urethane acrylate A1 in terms of active constituents, had insufficient rubbing resistance (steel wool resistance).

The film of Comparative Example 5, which contained, in the polymerizable composition R20, more than 40 wt % of the proportion of the urethane acrylate A3 in terms of active constituents and less than 35 wt % of the proportion of the multifunctional acrylate B3 in terms of active constituents, had insufficient rubbing resistance (steel wool resistance).

The film of Comparative Example 6, which contained the multifunctional acrylate B4 containing less than four functional groups in the polymerizable composition R21, had insufficient rubbing resistance (steel wool resistance).

The film of Comparative Example 7, which contained the multifunctional acrylate B5 containing less than four functional groups in the polymerizable composition R22, had insufficient rubbing resistance (steel wool resistance).

The film of Comparative Example 8, which contained the multifunctional acrylate B6 containing less than four functional groups in the polymerizable composition R23, had insufficient rubbing resistance (steel wool resistance).

The film of Comparative Example 9, which contained the multifunctional acrylate B7 containing less than three ethylene oxide groups for each functional group in the polymerizable composition R24, had insufficient rubbing resistance (steel wool resistance).

The film of Comparative Example 10, which contained, in the polymerizable composition R25, less than 15 wt % of the proportion of the urethane acrylate A3 in terms of active constituents and more than 60 wt % of the proportion of the multifunctional acrylate B3 in terms of active constituents, had insufficient rubbing resistance (steel wool resistance).

The film of Comparative Example 11, which contained the monofunctional acrylate C4 with an ethylene oxide group in the polymerizable composition R26 and thereby had a low compatibility with other components, had insufficient transparency of the polymerizable composition R26. The antifouling performance, adhesiveness, and rubbing resistance (steel wool resistance) were also insufficient.

The film of Comparative Example 12, which contained, in the polymerizable composition R27, less than 15 wt % of the proportion of the monofunctional acrylate C3 in terms of active constituents, had insufficient adhesiveness.

The film of Comparative Example 13, which contained, in the polymerizable composition R28, more than 30 wt % of the proportion of the monofunctional acrylate C3 in terms of active constituents, had insufficient rubbing resistance (steel wool resistance).

The film of Comparative Example 14, which had more than 50 wt % of the fluorine atom concentration in the release agent D3 in the polymerizable composition R29 and thereby had a low compatibility with other components, had insufficient transparency of the polymerizable composition R29. The antifouling performance, rubbing resistance, and reliability were also insufficient.

The film of Comparative Example 15, which contained no fluorine release agent (Component D) in the polymerizable composition R30, had insufficient antifouling performance and insufficient rubbing resistance.

The film in Comparative Example 16, which contained, in the polymerizable composition R31, more than 10 wt % of the proportion of the release agent D1 in terms of active constituents, had insufficient rubbing resistance (steel wool resistance) and insufficient reliability.

The film of Comparative Example 17, which contained a silicon-based release agent with no perfluoropolyether group as the release agent D4 in the polymerizable composition R32, had insufficient antifouling performance.

The film of Comparative Example 18, which contained a silicon-based release agent with no perfluoropolyether group as the release agent D5 in the polymerizable composition R33, was insufficient in antifouling performance, rubbing resistance, and reliability. The transparency of the polymerizable composition R33 was also insufficient.

The film of Comparative Example 19, which contained a silicon-based release agent with no perfluoropolyether group as the release agent D6 in the polymerizable composition R34, was insufficient in antifouling performance, rubbing resistance, and reliability. The transparency of the polymerizable composition R34 was also insufficient.

The film of Comparative Example 20, which contained a silicon-based release agent with no perfluoropolyether group as the release agent D7 in the polymerizable composition R35, was insufficient in antifouling performance, rubbing resistance, and reliability. The transparency of the polymerizable composition R35 was also insufficient.

The film of Comparative Example 21, which contained a fluorine release agent with no perfluoropolyether group as the release agent D8 in the polymerizable composition R36, was insufficient in antifouling performance (water repellency) and rubbing resistance.

The film of Comparative Example 22, which contained a fluorine release agent with no perfluoropolyether group as the release agent D9 in the polymerizable composition R37, was insufficient in antifouling performance (water repellency) and rubbing resistance.

The film of Comparative Example 23, which contained a fluorine release agent with no perfluoropolyether group as the release agent D10 in the polymerizable composition R38, was insufficient in antifouling performance (water repellency) and rubbing resistance.

[Additional Remarks]

An aspect of the present invention may be an antifouling film including: a substrate, and a polymer layer disposed on a surface of the substrate and including on a surface thereof an uneven structure provided with multiple projections at a pitch not longer than a wavelength of visible light, the polymer layer being a cured product of a polymerizable composition, the polymerizable composition containing, in terms of active constituents, 15 to 40 wt % of an urethane acrylate containing six or more functional groups, 35 to 60 wt % of a multifunctional acrylate containing four or more functional groups and 3 to 15 ethylene oxide groups for each functional group, 15 to 30 wt % of a monofunctional acrylate with no ethylene oxide group, 0.5 to 10 wt % of a fluorine release agent containing a perfluoropolyether group and having a fluorine atom concentration of 50 wt % or lower, and 0.5 to 5 wt % of a polymerization initiator. This achieves an antifouling film excellent in all of antifouling performance, adhesiveness, rubbing resistance, and reliability.

The polymer layer may include a surface having a coefficient of dynamic friction of 2.0 or lower. This achieves favorably improved rubbing resistance.

The polymer layer may include a surface having a contact angle of water of 130° or greater and a contact angle of hexadecane of 30° or greater. This achieves favorably improved antifouling performance.

The monofunctional acrylate may include one or both of N-acryloyl morpholine and N,N-dimethyl acrylamide. This can reduce the viscosity of the monofunctional acrylate and more improve the compatibility with the urethane acrylate, the multifunctional acrylate, and the fluorine release agent. Furthermore, when the substrate is a triacetyl cellulose film, the adhesiveness is more improved.

The polymer layer may have a thickness of 5.0 μm or more and 20.0 μm or less. This allows fluorine atoms in the fluorine release agent to be distributed on a surface (surface opposite to the substrate) of the polymer layer at a higher concentration.

The multiple projections may have an average pitch of 100 nm or longer and 400 nm or shorter. This sufficiently prevents occurrence of optical phenomena such as moiré and iridescence.

The multiple projections may have an average height of 50 nm or higher and 600 nm or lower. This can satisfy preferred average aspect ratio of the multiple projections.

The multiple projections may have an average aspect ratio of 0.8 or more and 1.5 or less. This sufficiently prevents occurrence of optical phenomena such as moiré and iridescence and can achieve excellent antireflective performance. This also sufficiently prevents occurrence of sticking and deterioration in transforming performance in formation of the uneven structure due to deterioration in processability of the uneven structure.

REFERENCE SIGNS LIST

1: Antifouling film
2: Substrate
3: Polymer layer
4: Projection
5: Polymerizable composition
6: Die
P: Pitch
T: Thickness of polymer layer

The invention claimed is:

1. An antifouling film comprising:
a substrate, and
a polymer layer disposed on a surface of the substrate and including on a surface thereof an uneven structure provided with multiple projections at a pitch not longer than a wavelength of visible light,
the polymer layer being a cured product of a polymerizable composition,
the polymerizable composition containing, in terms of active constituents, 15 to 40 wt % of an urethane acrylate containing six or more functional groups, 35 to 60 wt % of a multifunctional acrylate containing four or more functional groups and 3 to 15 ethylene oxide groups for each functional group, 15 to 30 wt % of a monofunctional acrylate with no ethylene oxide group, 0.5 to 10 wt % of a fluorine release agent containing a perfluoropolyether group and having a fluorine atom concentration of 50 wt % or lower, and 0.5 to 5 wt % of a polymerization initiator.

2. The antifouling film according to claim 1,
wherein the polymer layer includes a surface having a coefficient of dynamic friction of 2.0 or lower.

3. The antifouling film according to claim 1,
wherein the polymer layer includes a surface having a contact angle of water of 130° or greater and a contact angle of hexadecane of 30° or greater.

4. The antifouling film according to claim 1,
wherein the monofunctional acrylate includes one or both of N-acryloyl morpholine and N,N-dimethyl acrylamide.

5. The antifouling film according to claim 1,
wherein the polymer layer has a thickness of 5.0 μm or more and 20.0 μm or less.

6. The antifouling film according to claim 1,
wherein the multiple projections have an average pitch of 100 nm or longer and 400 nm or shorter.

7. The antifouling film according to claim 1,
wherein the multiple projections have an average height of 50 nm or higher and 600 nm or lower.

8. The antifouling film according to claim 1,
wherein the multiple projections have an average aspect ratio of 0.8 or more and 1.5 or less.

* * * * *